United States Patent
Grant et al.

(10) Patent No.: US 10,150,625 B2
(45) Date of Patent: Dec. 11, 2018

(54) SINGULATOR CONVEYOR SYSTEM FOR RIGID PARCEL AND LARGE BAGS OF SMALL PARCELS

(71) Applicant: Fives Intralogistics Corp., Louisville, KY (US)

(72) Inventors: Patrick H. Grant, Pee Wee Valley, KY (US); Steven Vann Schroader, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 14/392,374

(22) PCT Filed: Oct. 21, 2014

(86) PCT No.: PCT/US2014/000200
§ 371 (c)(1),
(2) Date: Feb. 24, 2016

(87) PCT Pub. No.: WO2015/060885
PCT Pub. Date: Apr. 30, 2015

(65) Prior Publication Data
US 2016/0176653 A1 Jun. 23, 2016

Related U.S. Application Data

(60) Provisional application No. 61/893,828, filed on Oct. 21, 2013.

(51) Int. Cl.
B65G 47/22 (2006.01)
B65G 47/02 (2006.01)
(Continued)

(52) U.S. Cl.
CPC .............. B65G 47/32 (2013.01); B07C 1/00 (2013.01); B07C 1/04 (2013.01); B65G 13/10 (2013.01);
(Continued)

(58) Field of Classification Search
None
See application file for complete search history.

(56) References Cited

U.S. PATENT DOCUMENTS

| 4,256,216 A | 3/1981 | Winters |
| 4,643,291 A | 2/1987 | Counter |

(Continued)

Primary Examiner — Kavel Singh
(74) Attorney, Agent, or Firm — Carrithers Law Office, PLLC

(57) ABSTRACT

A singulator conveyor system having conveyors arranged in adjacent parallel configuration for separating and orienting side-by-side packages having unequal loading, different sized packages (e.g., boxes, flats and softpacks), partially filled bags, long and slender articles, and packages having an offset center of gravity. Two of more small items abreast of one another are separated while permitting large items to pass thorough the singulator even when the item is a large bag of small items. A first conveyor lane includes a high friction surface for conveying articles forward along a vertical side wall. A second conveyor adjacent thereto has a low friction surface including both forward and lateral conveying forces urging parcels forward and away from the first conveyor and side wall toward a third conveyor having a high friction conveying surface wherein the longitudinal edge of the second conveyor is below the first conveyor and above the third conveyor.

17 Claims, 9 Drawing Sheets

(51) Int. Cl.
*B65G 47/30* (2006.01)
*B65G 47/32* (2006.01)
*B65G 47/256* (2006.01)
*B65G 13/10* (2006.01)
*B07C 1/00* (2006.01)
*B07C 1/04* (2006.01)
*B65G 47/68* (2006.01)

(52) U.S. Cl.
CPC .......... *B65G 47/256* (2013.01); *B65G 47/684* (2013.01)

(56) References Cited

U.S. PATENT DOCUMENTS

| | | | |
|---|---|---|---|
| 5,165,520 A | 11/1992 | Hervé | |
| 5,551,551 A | 9/1996 | Crawford | |
| 5,701,989 A * | 12/1997 | Boone | B65G 47/682 198/443 |
| 5,794,790 A | 8/1998 | Bonnet | |
| 5,950,800 A * | 9/1999 | Terrell | B65G 47/1492 198/448 |
| 6,076,683 A | 6/2000 | Okada | |
| 6,131,723 A * | 10/2000 | Schroader | B65G 47/256 198/398 |
| 6,325,877 B1 | 12/2001 | Murphy | |
| 6,328,151 B1 | 12/2001 | Spangenberg | |
| 6,543,602 B1 * | 4/2003 | Bonnet | B65G 17/08 198/370.02 |
| 6,609,607 B2 | 8/2003 | Woltjer | |
| 6,622,847 B2 | 9/2003 | Schuitema | |
| 6,910,568 B1 | 6/2005 | Ydoate | |
| 7,233,840 B2 | 6/2007 | Schiesser | |
| 7,497,316 B2 | 3/2009 | Hysell | |
| 7,703,596 B1 | 4/2010 | Grollitsch | |
| 7,726,461 B2 | 6/2010 | Risley | |
| 7,861,847 B2 | 1/2011 | Fourney | |
| 8,261,917 B2 | 9/2012 | Enenkel | |

* cited by examiner

SINGULATOR CONVEYOR SYSTEM FOR RIGID PARCEL AND LARGE BAGS OF SMALL PARCELS

REFERENCES TO RELATED APPLICATIONS

This application claims priority from U.S. Provisional Application Ser. No. 61/893,828 filed on Oct. 21, 2013 which is incorporated herein in its entirety.

TECHNICAL FIELD OF THE INVENTION

This invention relates generally to a singulator conveyor for sorting randomly arranged parcels and converting the random flow to a single file stream of items separating items which are not in the single file steam.

BACKGROUND OF THE INVENTION

The present invention relates to material handling and in particular to methods and apparatuses for conveying packages and a mechanism for controlling the location of packages on a conveyor.

Conventional conveyor systems convey large numbers of packages at high speed, especially in the parcel delivery industry wherein the packages are sorted according to the desired categories. The efficiency with which the packages are handled can be seriously diminished when a plurality of smaller packages, irregular sized or shaped items, or a mixture of large and small articles pass together on the conveyors as a single unit.

Problems occur with scanning and separating packages and parcels which travel through the conveying system as an aggregate unit rather than in a single file. Large packages hide small parcels and small side-by-side packages cause problems whenever they pass simultaneously through a scanner causing confusion and sorting problems. Moreover, packages such as bags or other flexible containers having the weight distributed unevenly, or where the width and length of the container are extreme, or where the container is soft or only partially full such as a floppy partially filled bag of mail tend to present sorting problems in that they do not move in predictable lateral patterns.

The use of unscrambling conveyors sometimes referred to as singulators uses a plurality of driven rollers or belts whose axes extend obliquely relative to the direction of conveyance causing packages to be displaced laterally toward one side of the conveyor and become aligned behind one another.

Typical singulator conveyor systems for sorting parcels in typical applications comprise devices used that take randomly arranged items and convert the random flow to a single file stream of items. The items are conveyed forward with both forward and lateral forces and aligned along one side. A device can be placed after the aligned stream of items and items that did not make it all the way to the wall on the aligned side, are separated laterally away from the primary stream of parcels. Typical configurations direct the laterally removed items and recirculate them back to the skewed roller section for another pass and opportunity to be aligned against the wall, to be passed through with the primary line of flow. Items are conveyed forward with both forward and lateral forces and aligned along one side.

Present technology works well for rigid parcels, like a box, but items that do not behave as a rigid item like flexible parcels or large bags containing several small items are separated in accordance with their center of gravity and tend to be removed from the parallel stream even when the item is not abreast of another item.

Rearrangement of clusters of articles into a singulated single file is difficult to accomplish with packages having one dimension that is significantly greater than its other dimensions. If several packages having unequal loading, partially filled bags or boxes, or long and slender articles are conveyed side-by-side, conventional article singulation conveyors have difficulty separating side-by-side pairs into single file especially over a short distance and residence time. Packages having unequal weight, irregular dimensions, and off-set center of gravity can get repeatably oriented on the output of the singulation conveyor. Occasionally instead of being positioned in single file, some of the packages may be conveyed abreast of one another, i.e., in side-by-side relationship traveling two abreast. The combined width of the two packages may present a problem at a downstream location in the conveyor system.

The need exists for a singulator conveying having separation and orientation capabilities effective in separating side-by-side packages and parcels having unequal loading such as different sized packages (e.g., boxes, flats and softpacks), partially filled bags or boxes, or long and slender articles having an offset center of gravity into one or more rows of single file singulated articles over a short distance and residence time.

The present invention insures that two of more small items abreast of one another are separated while permitting large items to pass thorough the singulator even when the item is a large bag of small items.

Sorting parcels in typical applications devices take randomly arranged items and convert the random flow to a single file stream of items. Items are conveyed forward with both forward and lateral forces and aligned along one side. A device can be placed after the aligned stream of items and items that did not make it all the way to the wall on the aligned side, are separated laterally away from the primary stream of parcels. Typical configurations direct the laterally removed items and recirculate them back to the skewed roller section for another pass and opportunity to be aligned against the wall, to be passed through with the primary line of flow. Prior art conventional conveying systems work well for rigid parcels, like a box, but items that do not behave as a rigid item, like a large bag of small items tend to be removed from the parallel stream even when the item is not abreast of another item. The instant invention provides an apparatus and method capable of separating rigid parcels as well as large bags of small parcels.

SUMMARY OF THE INVENTION

A singulator conveyor system comprises a selected number of conveyors arranged in an adjacent parallel configuration for separating and orienting side-by-side packages and parcels having unequal loading such as different sized packages (e.g., boxes, flats and softpacks), partially filled bags or boxes, or long and slender articles having an offset center of gravity into one or more rows of single file singulated articles over a short distance and residence time. The singulator conveying system insures that two of more small items abreast of one another are separated while permitting large items to pass thorough the singulator even when the item is a large bag of small items. A first conveyor lane includes a high friction surface for conveying articles forward along a vertical side wall where incoming items are positioned there along. A second conveyor adjacent thereto has a low friction surface or lower friction surface including both forward and lateral conveying forces urging parcels forward and away from the first conveyor and side wall. The second conveyor comprises a series of driven rollers whose rotary axes are skewed relative to a longitudinal direction of travel so that the packages are conveyed simultaneously longitudinally forward and laterally outwardly away from the first conveyor. The inner longitudinal edge of the second conveyor is positioned below the first conveyor and is transversely inclined and angled upward to a position just above the outer longitudinal edge of a third conveyor adjacent thereto having a high friction surface. Packages resting on the first conveyor, or on the first conveyor and second conveyor are conveyed through the singulator. Packages which fall off of the first conveyor onto the second conveyor or which rest entirely on the second conveyer are moved forward and laterally toward the third conveyor until the center of gravity of the packages extend pass the longitudinal edge of the third conveyor whereby control is transferred to the third conveyor and the packages fall over an inclined plane or drop off zone to be recirculated of re-routed.

The lateral momentum of the item being transferred laterally will tend to position the center of gravity of the item, so that the item falls under control of the third high friction lane's) forward conveying forces, no longer influenced by the conveying forces of the second lane. Small items, rigid and non rigid, entering and coming in contact with the first high friction lane, wholly, are not transferred laterally away from the primary flow side along the wall). Slightly larger items, rigid an non rigid, entering and coming in contact with the first high friction lane and the second will not tend to be transferred laterally away from the primary flow side along the wall), due to the substantially higher friction of the first lane. Slightly larger items, rigid an non rigid, entering and coming in contact with the first high friction lane and the second will not tend to be transferred laterally away from the primary flow side along the wall, due to the substantially higher friction of the first lane. Large rigid items, such as boxes, will enter and rest exclusively on the first and third lane and are not influenced by the lateral component forces of the second low friction lane, Large bags containing small items enter, and due to their lack of rigidity, with come into contact with all three lanes. But, the combination of friction forces presented by the first and third will tend to resist the lateral forces applied by the second lane, allowing the item to transfer straight through, without being laterally shifted away from the primary flow along the wall.

Coded articles are received from a feed conveyor and conveyed through a multi-conveyor section which tends to arrange the articles in a single file rows in a spaced apart relationship by a singulator comprising three conveyors arranged in an adjacent parallel configuration.

The present invention relates to a conveying system for conveying, aligning, and organizing randomly supplied articles including side-by-side articles received from a feed conveyor into a single file relationship. The articles are conveyed onto a singulator device having separating capabilities which includes a multi-lane conveyor assembly following the feed conveyor. The singulator arranged in alignment with, downstream of the feed conveyor for receiving articles therefrom. A downstream conveyor receives articles from the singulator receives the spaced apart aligned articles in two separate rows.

In one preferred embodiment, the singulator conveyor system comprises and/or consists of a first conveyor including a belt or rollers having a high friction surface for conveying articles along a vertical side wall where incoming items are positioned there along. Packages resting against the vertical side-wall and resting on the first conveyor will proceed across the conveyor. The first lane is sized to be no wider than the smallest item to be conveyed thereon. A second conveyor has an inner edge positioned below and adjacent to an outer longitudinal edge of the first conveyor and is angled downwardly toward the first conveyor. The second conveyor is typically at least as wide usually wider than the first conveyor. The second conveyor typically comprises a series of driven rollers whose rotary axes are skewed relative to a longitudinal direction of travel so that the packages are conveyed simultaneously longitudinally forward and laterally outwardly away from the first conveyor. The inner longitudinal edge of the second conveyor is positioned a selected distance below the outer longitudinal edge of the first conveyor situated adjacent the outer edge of the first conveyor having a high friction surface forming a longitudinal transverse inclined plane angled toward the first conveyor. The second conveyor has a low friction surface for receiving packages which fall therefrom. The lateral forces of the second conveyor pull items positioned on the second conveyor away from the first conveyor and primary flow side wall to separate two small items that might enter abreast of one another. Packages resting on the first conveyor and the outer portion of the second conveyor will proceed forward if the center of gravity rests upon the first conveyor; however, packages having a center of gravity resting on the second conveyor will be pulled away from the first conveyor onto the second conveyor. Packages which rest side by side or abreast one another are separated so that the package on the first conveyor moves forward and the adjacent package resting on the second conveyor is pulled away from the first conveyor. As noted previously, the second conveyor is transversely inclined away from the outer longitudinal edge of the first conveyor and upward toward an inner longitudinal edge slightly above a third conveyor which has a high friction surface positioned adjacent the longitudinal outside edge of the second conveyor lane on the opposite side from the first conveyor primary flow side. The third conveyor is a high friction conveyor which is typically no wider than the first conveyor and may be of the same width as the first conveyor. It is usually of narrower width than the second conveyor because it moves articles longitudinally forward with no lateral motion; however, it is contemplated that the speed of the first, second or third conveyors could be adjusted with respect to one another to align articles thereon. Moreover, the speed of the conveyors could be adjusted relative to one another to enhance the separation capabilities of the singulator conveyor.

The singulator conveyor system consists of and/or comprises a multi-conveyor assembly, which includes a singulator comprising or consisting of a driven first conveyor having a high friction surface for conveying articles along in a forward direction in a generally horizontal plane forming a first conveying lane, a vertical side wall extending along an outer longitudinal edge of the first conveyor. A driven second conveyor is positioned adjacent to an inner longitudinal edge of the first conveyor. The second conveyor has a lower longitudinal edge positioned below the first conveyor extending upward therefrom at a selected angle forming an inclined plane and at a selected distance therefrom forming a first transition zone. The second conveyor has a low friction surface and a series of driven rollers whose rotary axes are skewed relative to a longitudinal direction of travel for conveying packages simultaneously longitudinally forward and laterally outwardly away from the first conveyor. A driven third conveyor having a high friction surface for conveying articles along in a forward direction in a generally horizontal plane forms a third conveying lane disposed adjacent a second outer edge of the second conveyor. A second transition zone is formed between the second conveyor transversely inclining upward having an outer longitudinal edge extending upward toward an inside longitudinal edge of the third conveyor and the upper longitudinal edge of the second conveyor is below the inside edge of the third conveyor. The second transition zone defines an area where the outside edge and conveying surface of the second conveyor is spaced apart from and positioned even with or below the inner receiving edge and conveying surface of the third conveyor; however, the second conveyor is inclined upward at a transverse angle forming a conveying surface having an inclined plane extending above or even with the conveying surface of the third conveyor. A drop off-off zone may be disposed adjacent an outer edge of the third or other outer conveyor opposite the vertical side wall for receiving packages which fall off of the edge thereof.

It is an object of the present invention to provide a singulator comprising a multi-lane conveyor assembly having at least three driven conveyors arranged in parallel relationship adjacent one another. The conveyors lie in a horizontal plane along their longitudinal axis. A laterally positioned side wall extends along side a first conveyor which tends to convey items forward and along the laterally positioned side wall.

It is an object of the present invention to provide a driven first conveyor lane including a belt or rollers having a high friction surface for conveying articles along a vertical side wall where incoming items are positioned there along at a selected speed.

It is an object of the present invention to provide that packages resting on the first conveyor lane having a high friction surface and objects resting on both the first conveyor lane and the second conveyor lane having a low friction surface move forward.

It is an object of the present invention to provide a second conveyor having a low friction surface conveyor lane including both forward and lateral conveying forces. The edge of the second conveyor adjacent the first conveyor is disposed at a slightly lower elevation along the longitudinal axis of the first conveyor providing a drop off. The lateral forces of the second conveyor pull the articles positioned on the second conveyor away from the first conveyor and primary flow side wall to separate two small items that might enter abreast of one another.

It is an object of the present invention to provide for the low friction conveying surface of a second conveyor lane to be angled vertically at a selected angle from the first conveyor providing an inclined plane extending upward from below the outside longitudinal edge of the first conveyor upward toward the third conveyor so that the longitudinal edge of the second conveyor is slightly higher than the longitudinal edge of the adjacent third conveyor whereby articles are removed laterally as they move forward progressing on a somewhat inclined plane. The second conveyor includes forward and lateral forces away from the first conveyor and upward toward the third conveyor.

It is an object of the present invention to provide a driven third conveyor having a high friction surface conveyor lane which is laterally positioned alongside of the second conveyor lane on the opposite side from the first conveyor primary flow side. In one preferred embodiment, the third conveyor is elevated at the same level as the first conveyor. The conveying surface of the third conveyor lane is above the elevation of a carrying surface of the second conveyor lane where they mate along their longitudinal edge.

It is an object of the present invention to provide that the outside edge of the second conveyor lane is higher than the inside edge of the third conveyor lane.

It is an object of the present invention to provide that the plane of the third conveyor extends above the surface of the second conveyor.

It is an object of the present invention to provide that the plane of the second lane extends above the surface of the third conveyor.

It is an object of the present invention to provide a means to separate packages traveling abreast of one another so that packages or articles that do not come in contact with the first conveyor lane and rest on the second conveyor lane are carried forward and laterally toward the edge of the plane extending just below the third high friction conveyor lane. A portion of each article or package that extends above the third conveyor lane will move upward and over the third conveyor lane until the center of gravity extends pass the longitudinal mating edge of the second conveyor and third conveyor and the package drops onto the high friction surface of the third conveyor. Thus, when two articles enter the singulator abreast of one another, the outwardly positioned article is transferred forward and laterally until the center of gravity passes beyond the longitudinal edge of the second conveying lane, at which time a definite transfer of control will occur as the item drops down and rests atop of the third conveyor lane.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
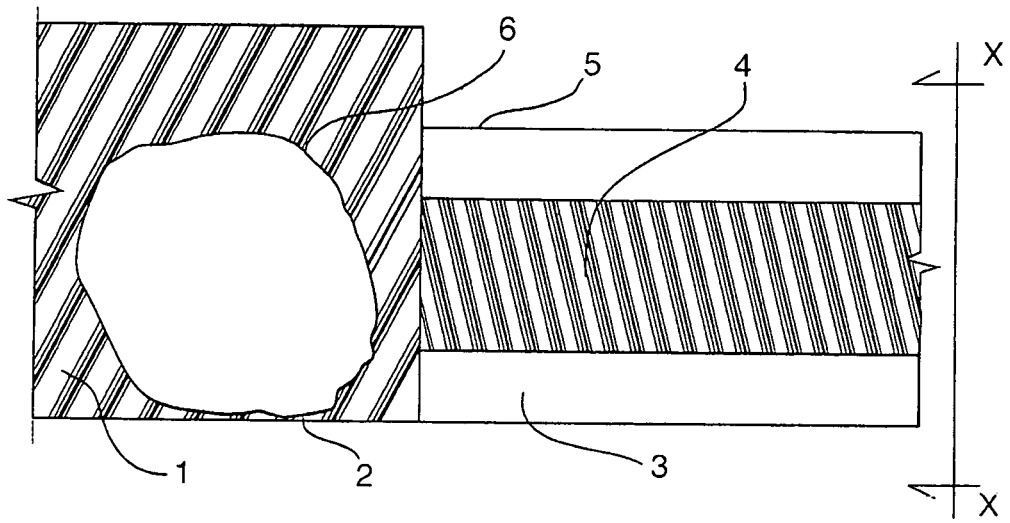
FIG. 1 is a top view showing a feed conveyor comprising a plurality of skewed rollers conveying articles along a laterally positioned side wall onto a singulator having a first conveyor surface having a high friction surface adjacent and parallel to the side wall, a second conveyor surface having a low friction surface comprising skewed rollers parallel to and adjacent the first conveyor, and a third conveyor surface having a high friction surface adjacent to and parallel with the second conveyor wherein a bag or small parcels are disposed upon the feed conveyor.

As shown in FIGS. 1-16, the present invention relates to a conveying system for conveying, aligning, and organizing articles in side-by-side relationship into randomly supplied articles.

As shown in FIGS. 1-6, the articles such as a bag or small parcels 6 or packages 7, 8 are conveyed from a feed conveyor 1 comprising a plurality of skewed rollers onto a multi-lane singulator conveyor assembly 11 having separating capabilities. The singulator 11 is arranged in alignment with, downstream of, and below the lower end of the feed conveyor 11 for receiving articles therefrom. The singulator includes a central conveying surface including a plurality of driven skewed rollers disposed between a pair of high friction surface belt conveying surfaces. A downstream conveyor receives articles from the singulator spaced apart and in single file.

In one preferred embodiment, the singulator assembly 11 includes first conveyor 3 including rollers or preferably a belt having a high friction surface for conveying articles 6 along a vertical side wall 2 where incoming items are positioned there along. Packages resting against the vertical side-wall 2 and resting on the first conveyor 3 will proceed across the conveyor to the down stream conveyor 32. The first lane is sized to be no wider than the smallest item to be conveyed thereon.

Figure 2:
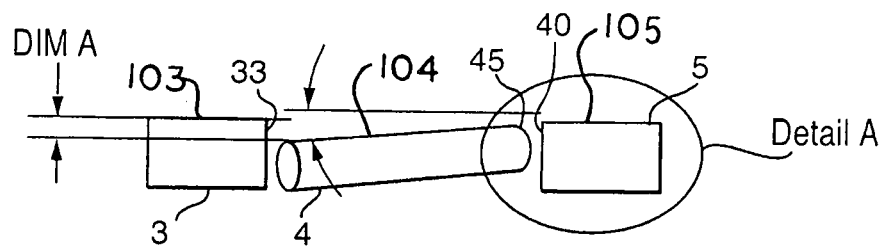
FIG. 2 is a sectional view of FIG. 1 showing the conveying surface of the second conveyor is angled vertically upward forming an inclined plane and that the lower edge of the conveying surface extends below the first conveyor and the upper edge of the conveying plane extends above the third conveyor.
Figure 3:
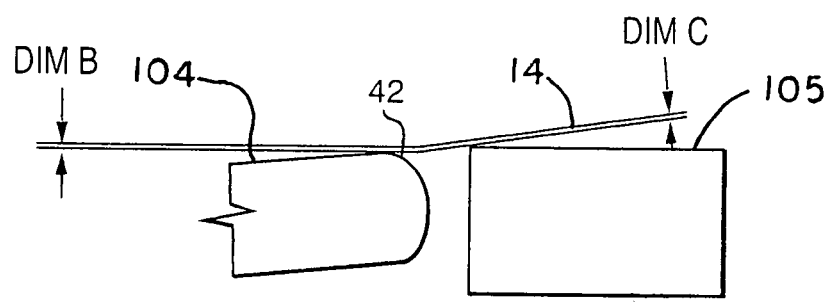
FIG. 3 is a enlargement of a portion of FIG. 2 showing that the longitudinal edge of the low friction conveying surface of the second conveyor is set at an elevation above the elevation of the third conveyor primary lane and that the plane of the third conveyor extends above the surface of the second conveyor and that the plane of the second lane extends above the surface of the third conveyor.
Figure 4:
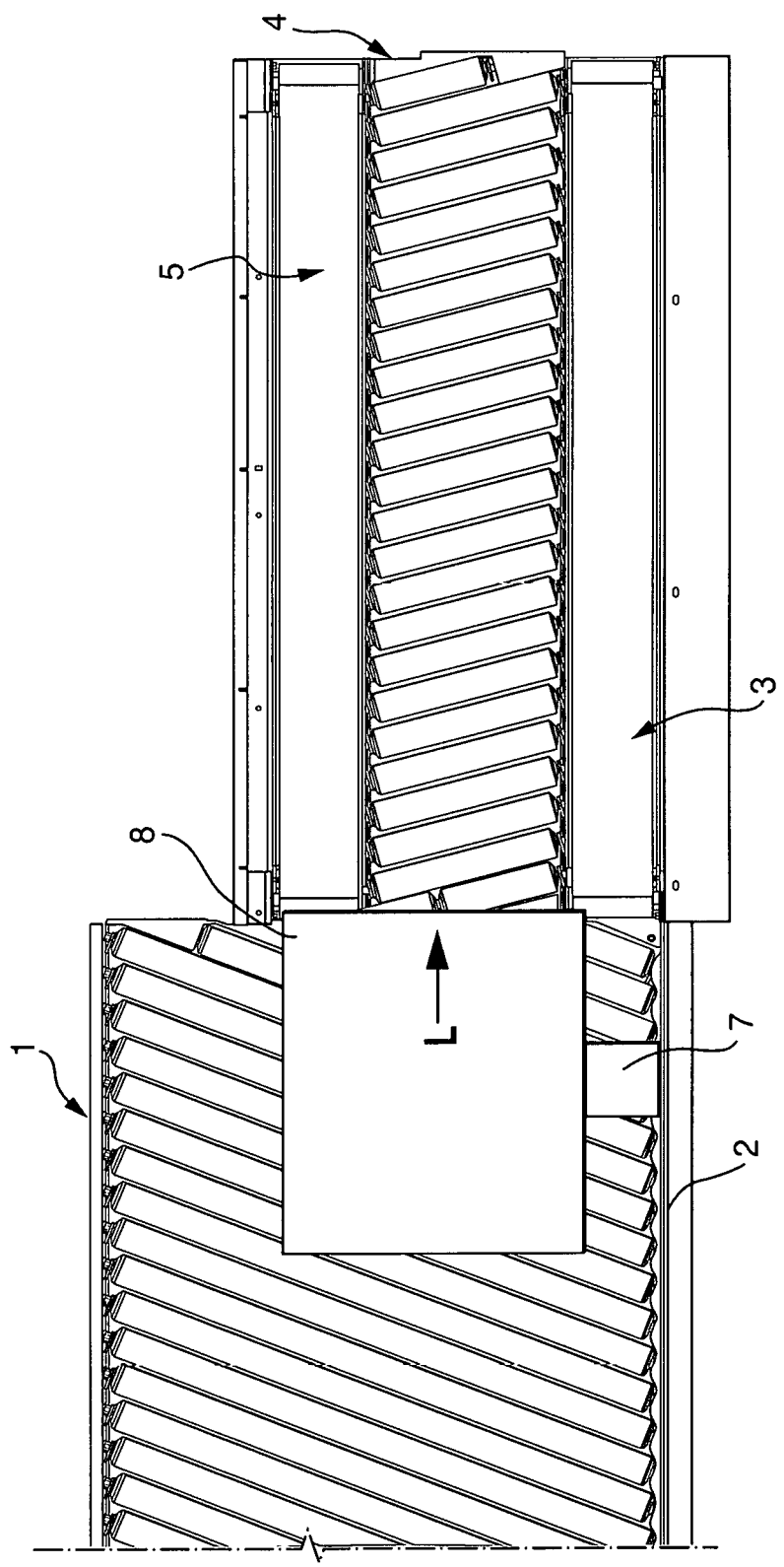
FIG. 4 shows a small package in alignment with the side wall and first conveyor and a large package adjacent thereto in alignment with the second and third conveyors.
Figure 5:
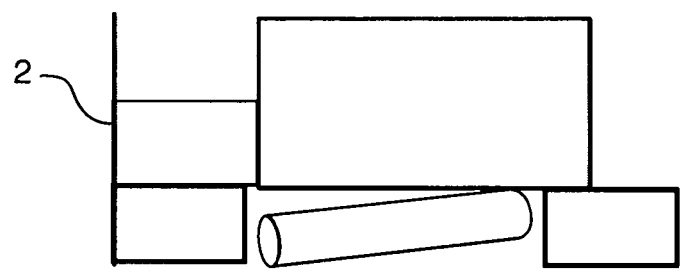
FIG. 5 is a sectional view of FIG. 4, showing the small package aligned with and conveyed on the first conveyor and showing the large package having a portion positioned on the second conveyor and a portion supported by the third conveyor.
Figure 6:
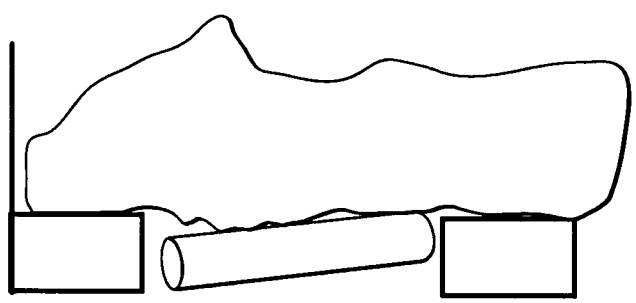
FIG. 6 shows a sectional view of FIG. 4 wherein a partially fill bag of small parcels positioned on the first, second, and third conveyors in a sectional view.
Figure 7:
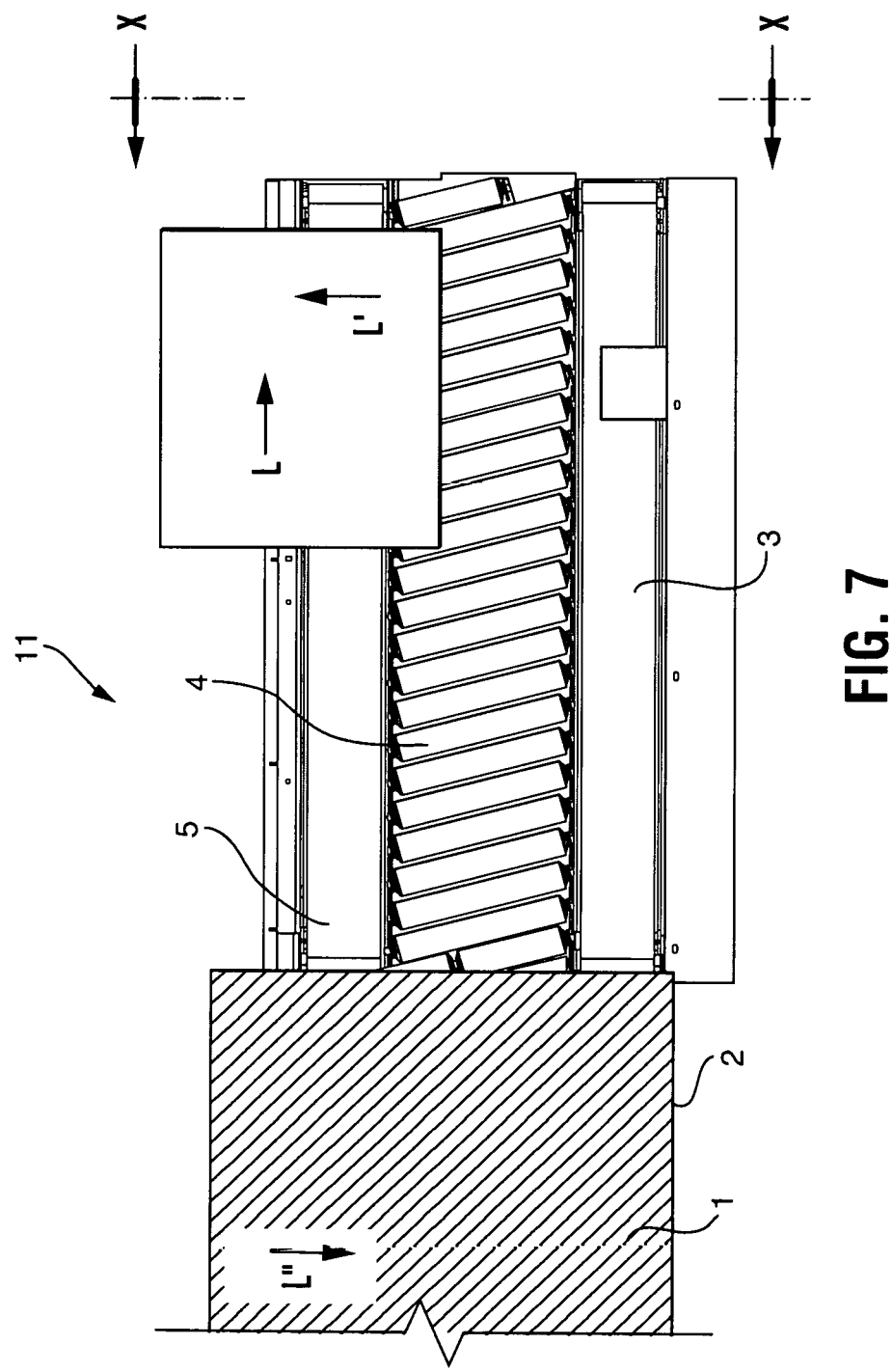
FIG. 7 shows the first, second, and third conveyors of FIG. 4, wherein the small package is aligned with and conveyed on the first conveyor, and the second larger package is positioned so that a portion rests on the second conveyor and a portion rests on the third conveyor.
Figure 8:
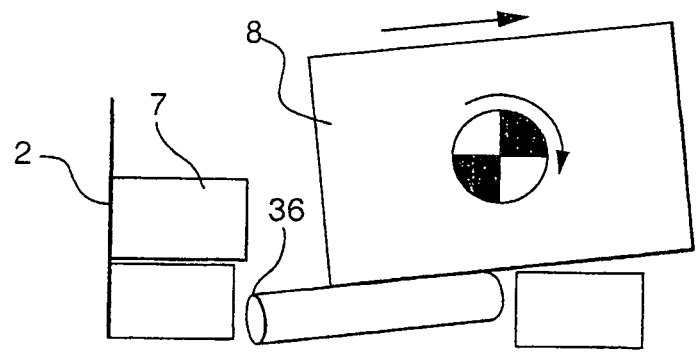
FIG. 8 is a sectional view of FIG. 7 showing the small package aligned with and conveyed on the first conveyor and showing the second larger package positioned so that a portion rests on the second conveyor and a portion rests on the third conveyor wherein the second conveyor pushes the package up onto the third conveyor and the high friction surface pulls or drags the large package laterally up onto the third conveyor off of the second conveyor.
Figure 9:
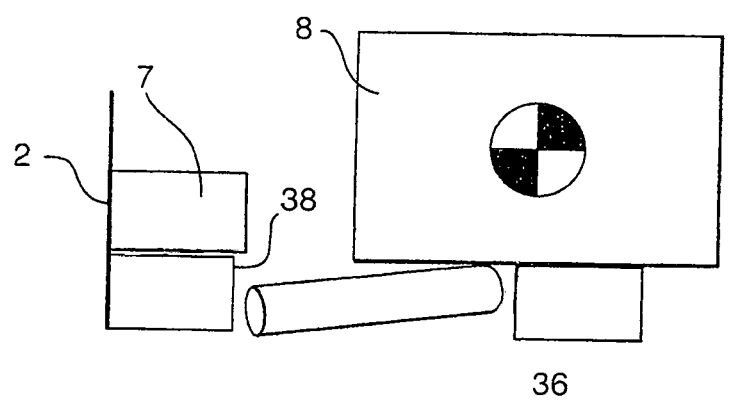
FIG. 9 is a sectional view of FIG. 7 showing the small package aligned with and conveyed on the first conveyor adjacent the side wall, and showing the second package pulled from the second conveyor up onto the third high friction conveyor having a portion extending over the outside edge thereof.

A second conveyor 4 having a low friction surface shown comprising a plurality of rollers 34 has an inner edge 36 positioned below and adjacent to an outer longitudinal edge 38 of the first conveyor 3 and is angled downwardly toward the first conveyor. The second conveyor 4 is typically at least as wide usually wider than the first conveyor 3. The second conveyor 4 typically comprises a series of driven rollers 34 whose rotary axes are skewed relative to a longitudinal direction of travel so that the packages are conveyed simultaneously longitudinally forward and laterally outwardly away from the first conveyor. The inner longitudinal edge 36 of the second conveyor is positioned a selected distance below the outer longitudinal edge 38 of the first conveyor 3 situated adjacent the outer edge 38 of the first conveyor having a high friction surface forming a longitudinal transverse inclined plane angled toward the first conveyor as best shown in FIGS. 2 and 3. The second conveyor 4 has a low friction surface for receiving packages which fall therefrom. The lateral forces of the second conveyor pull items positioned on the second conveyor away from the first conveyor and primary flow side wall to separate two small items 7, 8 that might enter abreast of one another. Packages resting on the first conveyor and the outer portion of the second conveyor will proceed forward if the center of gravity rests upon the first conveyor; however, packages having a center of gravity resting on the second conveyor will be pulled away from the first conveyor onto the second conveyor. Packages which rest side by side or abreast one another are separated so that the package on the first conveyor moves forward and the adjacent package resting on the second conveyor is pulled away from the first conveyor. As noted previously, the second conveyor is transversely inclined away from the outer longitudinal edge of the first conveyor and upward toward an inner longitudinal edge 40 of a third conveyor 5 slightly above the third conveyor which has a high friction surface positioned adjacent the longitudinal outside edge 42 of the second conveyor on the opposite side from the first conveyor primary flow side. The third conveyor 5 is a high friction conveyor which is typically no wider than the first conveyor and may be of the same width as the first conveyor 3. It is usually of narrower width than the second conveyor 4 because it moves articles longitudinally forward with no lateral motion; however, it is contemplated that the speed of the first, second or third conveyors could be adjusted with respect to one another to align articles thereon.

The inclined plane and angle of the rollers of the second conveyor 4 guide and urge articles upwardly toward and over the inner longitudinal edge 40 of the third conveyor 5 and into engagement with the third conveyor 5 extending along that edge once the center of gravity passes over the edge of the second conveyor 4 onto the third conveyor. Any packages resting on the second conveyor 4 and third conveyor 5 are dragged onto the third conveyor 5 and over onto a take off chute or drop off zone which defines a fourth conveying surface comprising a transverse inclined plane chute 30 for recirculation or rerouting.

Packages which rest on the first conveyor and pass over the singulator in single file may be transferred to a downstream conveyor which may include a transverse take off plane or chute 30 which may optionally include another series of rollers of high or low friction along an outer longitudinal edge to remove oversize packages or packages having particular dimensions. A deflector 44 may be positioned downstream of the singulator adjacent the outer longitudinal edge of the singulator or other downstream conveyor 32 extending from the plane of the conveyor downward joining the fourth conveying surface comprising the transverse inclined take off plane 30 to guide packages resting on the hanging over the conveyor onto or away from the conveyor depending upon the center of gravity of the package.

The feed conveyor 1 is typically as wide as if not wider than the singulator 11 and may comprise a series of driven rollers whose rotary axes are skewed relative to a longitudinal direction of travel so that the packages are conveyed simultaneously longitudinally forward L and laterally inwardly L" toward the first conveyor 3 and side wall 2. The feed conveyor may also end in a staggered formation where the proximate portion 46 adjacent the side wall 2 feeds the inside high friction conveyor of the singulator, a second distal portion 48 feeds the second conveyor, a third portion 50 feeds the third conveyor and an optional fourth portion 50 extends outwardly toward an adjacent conveying surface comprising a transverse plane forming a inclined discharge chute 30. Additional distal end portions could feed other conveyors and/or discharge or directional chutes.

A preferred embodiment of the singulator 11 includes three driven conveyors 3,4,5 arranged in parallel relationship adjacent one another. Additional lanes utilizing the same conveyor configuration is possible. The conveyors typically lie in a horizontal position along their longitudinal axis. A laterally positioned side wall 2 extends along side a first conveyor 3 which tends to convey items forward and along the laterally positioned side wall 2.

The driven first conveyor lane 3 includes a solid or mesh belt 22 or rollers having a first high friction surface for conveying articles 7, 8, along a vertical side wall 2 where incoming items are positioned there along at a selected speed. The width of the conveyors is determined by the size or dimensions of the packages. The width of the first conveyor is sized to be equal to the smallest package.

A second conveyor 4 having a low friction surface conveyor lane includes both a forward (L) and lateral (L') conveying forces. The second conveyor 4 typically comprises a series of driven rollers 34 whose rotary axes are skewed relative to a longitudinal direction of travel so that the packages are conveyed simultaneously longitudinally forward (in direction L) and laterally outwardly L' away from the first conveyor 3 and side wall 2. As a result the packages tend to become united in a single file traveling longitudinally along the side wall 2 on the first conveyor surface 3, or the center of gravity or frictional forces cause the package to extend over the edge of the first conveyor 3 and a portion to rest on the second conveyor 4 which moves in a forward direction L and lateral direction L'. The package would still move forward so long as a portion rests upon the high friction surface of the first conveyor 3. The width of the second conveyor 4 having the low friction surface is typically greater than the width of the first and third conveyor 5 having low friction surfaces in order to allow lateral movement and separation of the packages thereon.

Figure 10:
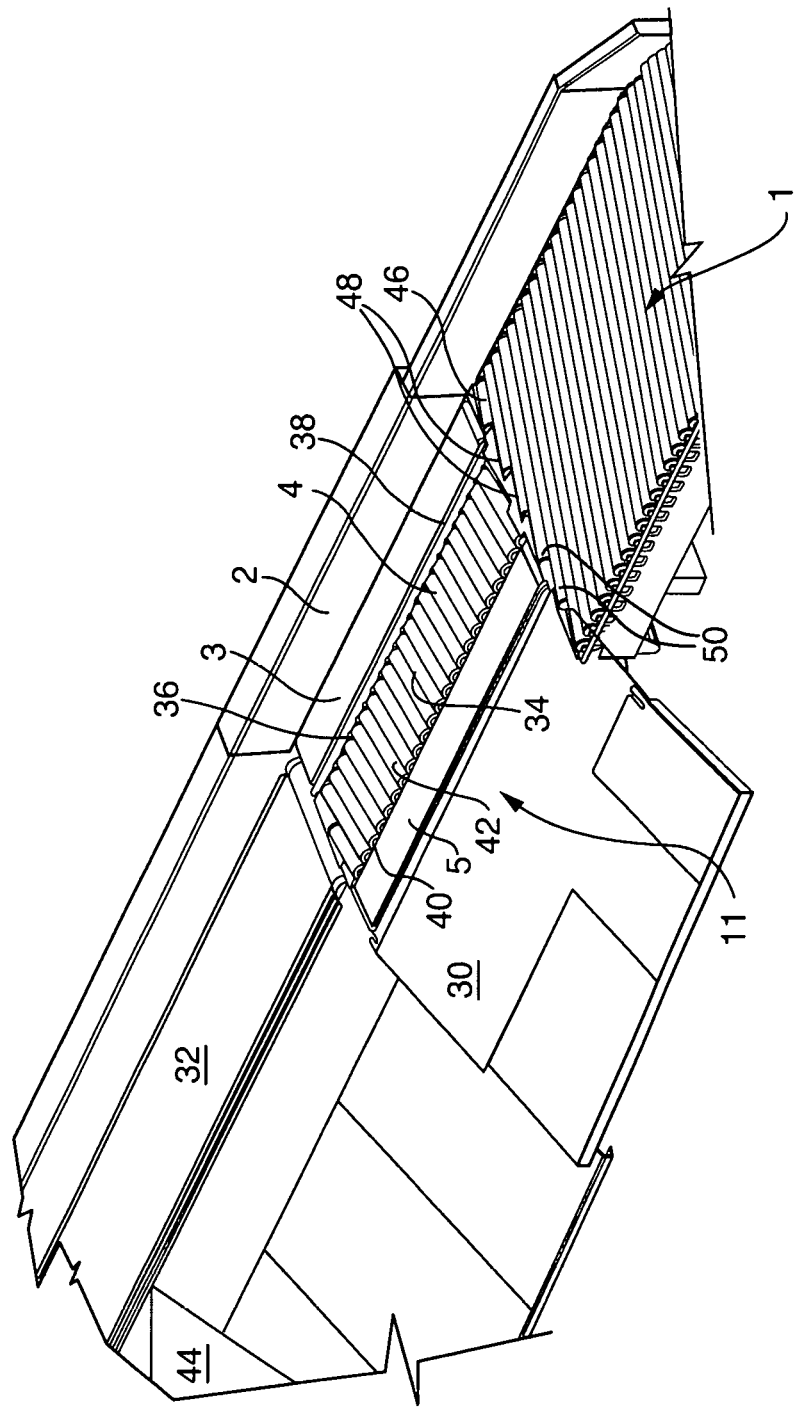
FIG. 10 is a perspective view of the singulator assembly of the present invention showing the feed conveyor, first conveyor having a high friction belt, second conveyor having low friction rollers, and third conveyor having a high friction belt, a down stream conveyor and fourth conveying means comprising an inclined transverse plane extending along the longitudinal edge of the third conveyor, feed conveyor, and downstream conveyor.
Figure 11:
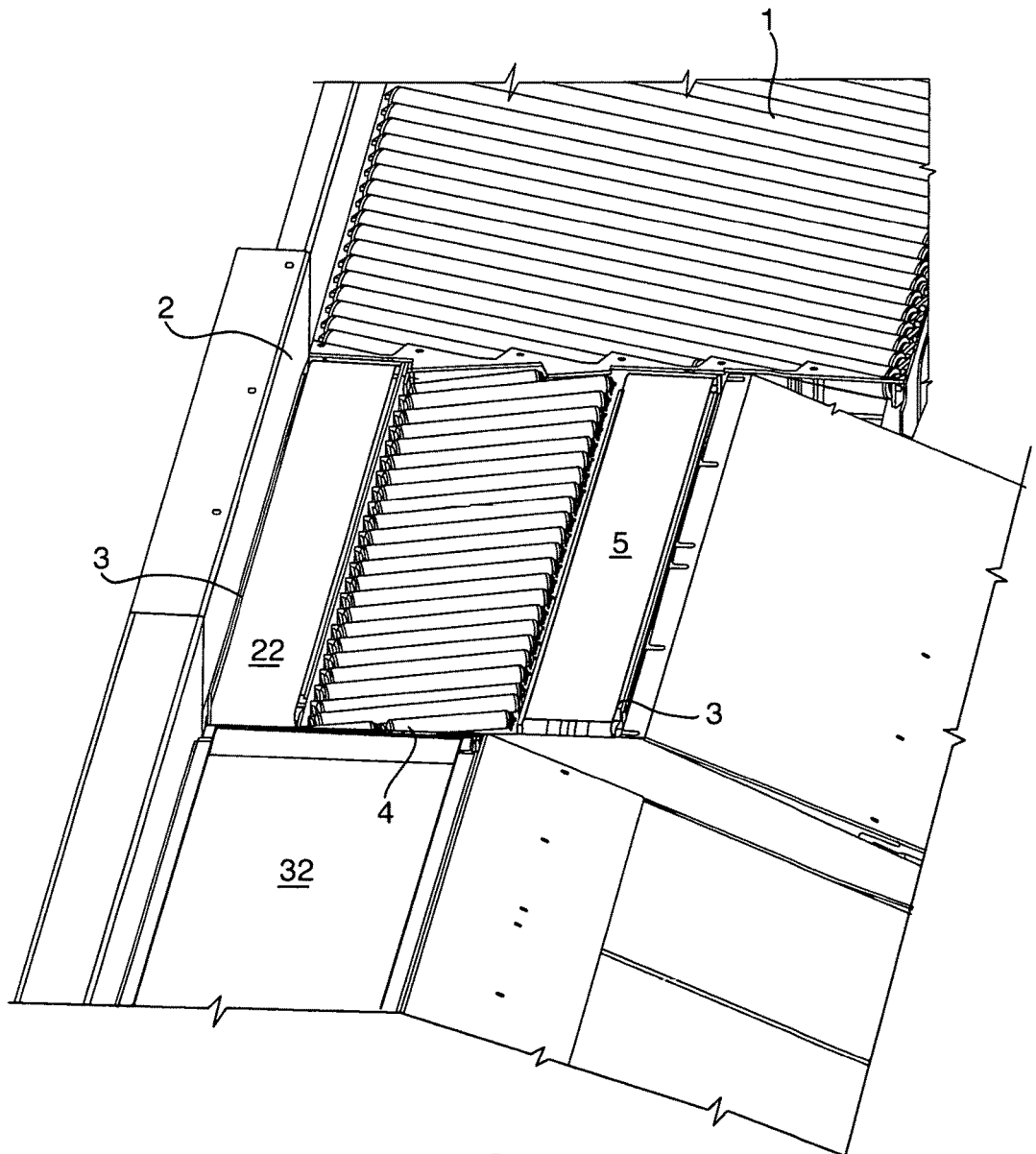
FIG. 11 is a perspective up stream end view of the singulator assembly shown in FIG. 10 showing the inside longitudinal edge of the second conveyor positioned below the longitudinal outer edge of the first conveyor and showing the incline plane of the second conveyor angled upward from and toward the third conveyor wherein the distal end of the second conveyor rollers extend above the longitudinal edge of the third conveyor.
Figure 12:
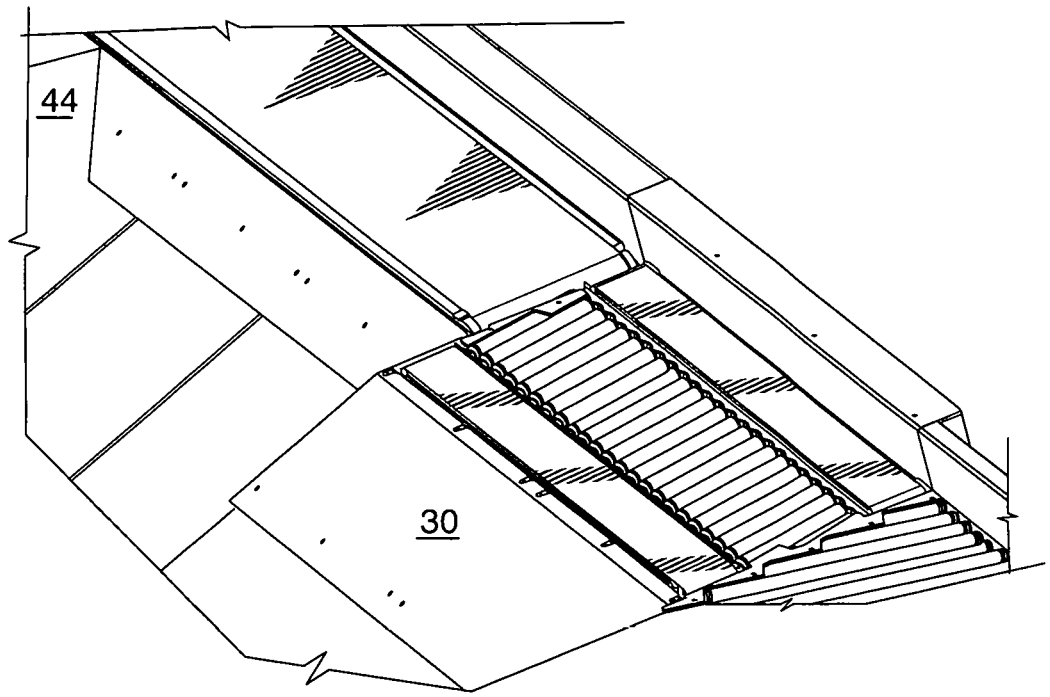
FIG. 12 is a perspective down stream end view of the conveyor system shown in FIGS. 10 and 11.
Figure 13:
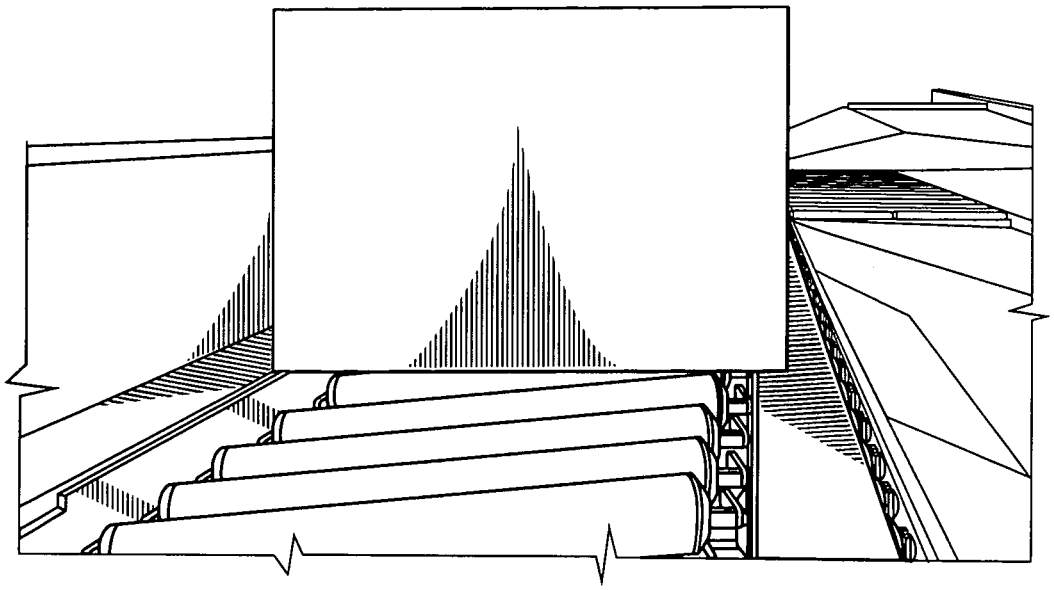
FIG. 13 is an up stream perspective end view of the conveyor assembly of FIG. 10, showing a package resting on the first conveyor and a portion of the second conveyor elevated above the surface of the third conveyor on the discharge side.
Figure 14:
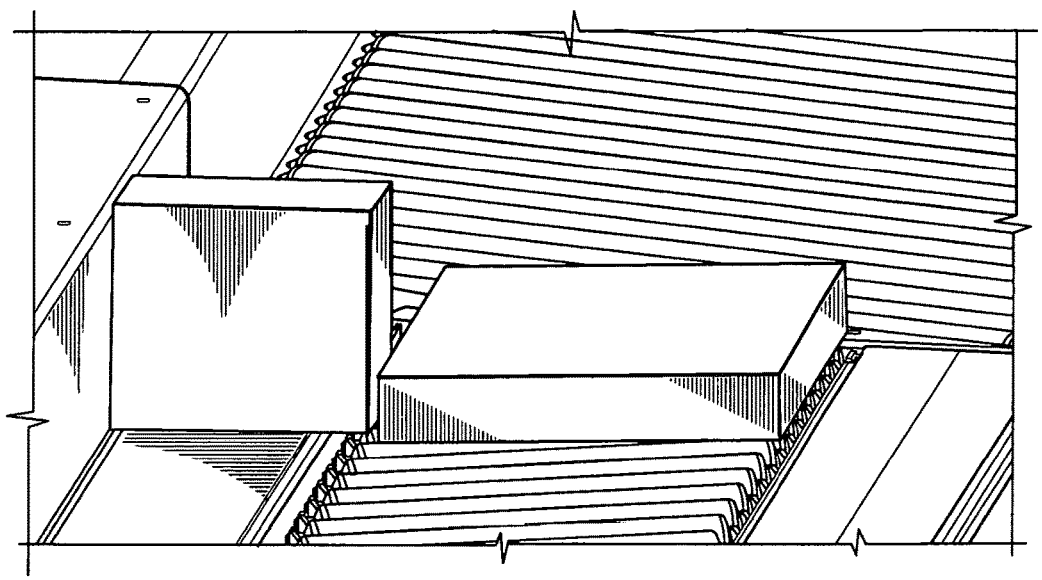
FIG. 14 is an up stream perspective end view showing a package resting on the first conveyor moving forward and a side by side package resting on the second conveyor moving forward and laterally toward the third conveyor.
Figure 15:
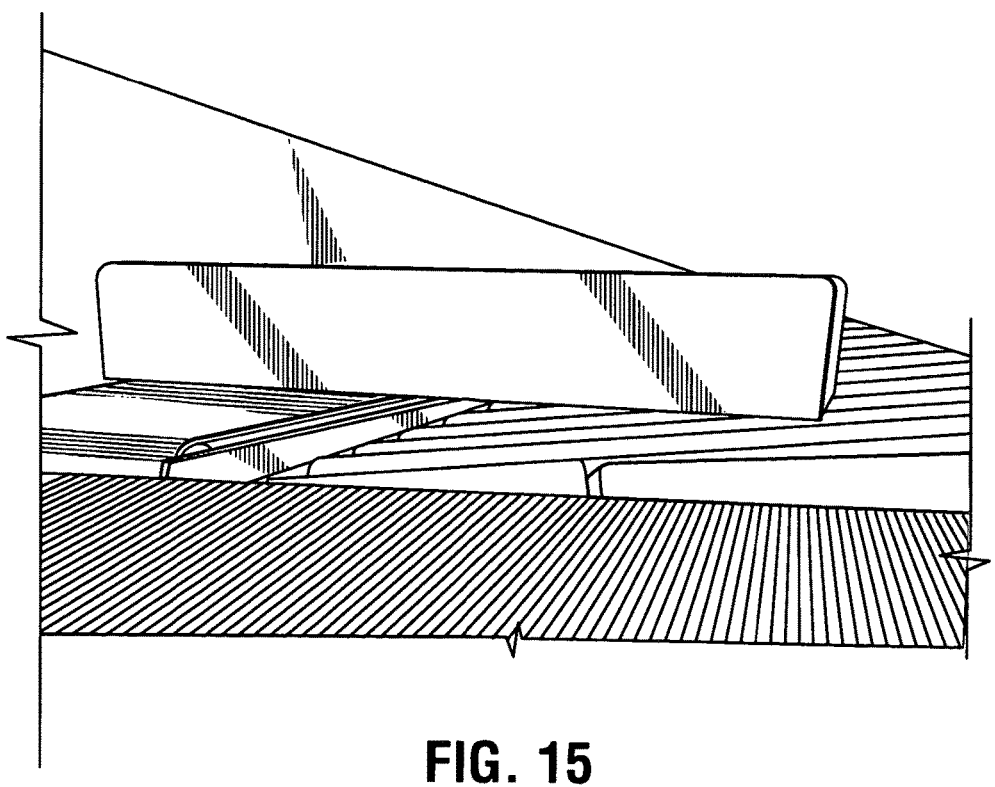
FIG. 15 is an up stream perspective end view of the conveyor assembly of FIG. 10, showing a package resting on the first conveyor and a portion of the second conveyor which is moved forward to the down stream conveyor.

As shown in FIG. 10, the inner edge 36 of the second conveyor adjacent the outer edge 38 of the first conveyor is disposed at a slightly lower elevational along the longitudinal axis, then the first conveyor providing a lower elevation 33 situated between the first and second conveyors so that packages resting on both the first conveyor 3 high friction surface and the second conveyor 4 low friction surface will be held securely and pulled forward by the first conveyor 3. The low friction conveying surface of the second conveyor 4 is angled vertically upward at a selected angle of up to 30 degrees from the outer edge of the first conveyor providing an inclined plane extending upward toward the third conveyor so that the outer longitudinal edge 45 of the second conveyor is slightly higher than the inner longitudinal edge 40 of the adjacent third conveyor whereby articles are removed laterally as they move forward progressing on a somewhat inclined plane.

Thus, the low friction conveying surface of the second conveyor is set at an elevation below the elevation of the high friction first conveyor primary lane where it mates with the first conveyor. The second conveyor includes forward and lateral forces away from the first conveyor and upward toward the third conveyor. The top side outer edge 33 of the angled second conveyor extends upward to a longitudinal transition zone 36 positioned slightly below or even with the longitudinal receiving edge 40 of the third conveyor.

The conveying surface (104) of the second conveyor 4 lane is set at an elevation below the conveying surface (103) of the primary first conveyor 3 lane (DIM A), where it mates with the primary high friction first lane as best illustrated in a section view of FIGS. 2 and 3. A plane that includes the conveying surface of the second plane of the second conveyor 4 extends above (DIM C) the conveying surface (105) of the third, high friction lane of the third conveyor 5. The conveying surface the second conveyor 5 lane is below (DIM B) the elevation of a plane that includes the third conveyor lane 3 where they mate forming a transition zone.

When packages positioned abreast of one another on the feed conveyor are feed onto the singulator, the forward forces of the first conveyor pulls the package forward toward the side wall and the lateral forces of the second conveyor forces the adjacent package away from the primary flow side wall to separate two small items that might enter abreast of one another.

The driven third conveyor has a high friction surface conveyor lane which is laterally positioned alongside of the second conveyor lane on the opposite side from the first conveyor primary flow side. In one preferred embodiment, the third conveyor is elevated at the same level as the first conveyor. The conveying surface of the third conveyor lane is above the elevation of a plane that includes the second conveyor lane where they mate along their longitudinal edge.

Large packages which hang over the side of the first conveyor lane having a portion resting on the second conveyor lane are carried forward A portion of each article or package that extends above the third conveyor lane will move upward and over the third conveyor lane until the center of gravity extends pass the longitudinal mating edge of the second conveyor and third conveyor and the package drops onto the high friction surface of the third conveyor which pulls the article moving forward toward a discharge position.

The first conveyor 3 and third conveyor 5 high friction conveying lanes can each be formed by endless conveyor belts comprised of rollers covered or coated with a high friction surface such as a rubber or an elastomer compound; a roller comprising a plastic or rubber compound or solid or mesh belts comprising rubber, elastomers, or polymers. The low friction conveying lane of the second conveyor 4 is typically composed of metal such as aluminum or stainless steel or a plastic material, a graphite material, or a tetrafluoroethylene, "TEFLON" material. The second conveyor lane might be formed by using a plastic modular belting, containing driven rollers with presenting a conveying force with a lateral component.

The first conveyor and third conveyor high friction conveying lanes can each be formed by a plurality of rollers with an axis that is substantially horizontal and perpendicular to the primary flow direction, and includes a high friction surface. The first conveyor and third conveyor need not be both of same type, but preferably comprise an endless belt or high friction surfaced rollers.

The second conveyor 4 lane can be formed by plurality of rollers oriented to generate conveying forces that are forward with primary flow direction of the first high friction conveyor and also having a lateral component away from the first conveyor and primary wall, and include an upward component in the lateral direction away from the first conveyor primary flow lane.

The entire machine might not be arranged with both high friction surfaces horizontal, but could be arranged at an angle so that the second lane falls in a horizontal plane, or at a point where all three are at an angle, but the relative positions is maintained as described above.

In another preferred embodiment, the second conveyor includes a low friction surface traveling in a forward direction and lateral direction away from the first conveyor and toward the third conveyor. The edge of the second conveyor is disposed below the first conveyor and forms an inclined plane angled upward from the first conveyor toward the third conveyor but slightly above the plane of the third conveyor. In this manner, when a package travels along having a portion resting on the first and second conveyor, the package will tend to be pulled forward. Packages will tend to move from the second conveyor toward the third conveyor along the inclined plane. Moreover, packages resting on the second conveyor and third conveyor will be dragged onto the third high friction conveyor to a position where the center of gravity is over the third conveyor and supported thereon. It is contemplated that the speed of the first conveyor having a high friction surface may be increased with respect to the second conveyor which will tend to arrange packages in a single file because the package adjacent the side wall will move ahead of the package resting on the second conveyor or (first and second conveyor) as both are urged in the direction of travel. Because this feature of the invention provides for positioning and aligning packages based upon contact with any portion of the package or article, the singulator removes side-by-side packages which have a package dimension which may be transverse to the direction of travel of the conveying surface by operating on the transverse width of the package as well as the center of gravity of the package. Even when the load is not distributed uniformly such as a partially filled bag, the bag will be moved and positioned onto the first or second conveyor depending upon the center of gravity of the package. Packages resting on both the second and third conveyors having a lateral dimension transverse to the direction of travel of the conveying surface will be pulled onto the third conveyor.

The present invention also includes a method of conveying articles. The method consists of or comprises transferring articles in single file or side by side onto a singulator device comprising at least three driven conveyors arranged in an adjacent parallel configuration. Moving articles along a first conveyor having a high friction surface for conveying articles forward along a vertical side wall where incoming items are positioned there along. Moving articles onto a adjacent second conveyor having a low friction surface disposed adjacent the first conveyor wherein the longitudinal edge of the second conveyor is at a lower elevation than the first conveyor and wherein the second conveyor comprises a series of driven rollers having rotary axes skewed relative to a longitudinal direction of travel so that the packages are conveyed simultaneously longitudinally forward and laterally outwardly away from the first conveyor with the second conveyor is transversely inclined and angled upward. Articles from the second conveyor move upward forward and laterally from the second conveyor toward a third conveyor having a high friction surface.

More particularly, the method of conveying articles utilizes a conveying system including a singulator having at least three driven conveyors arranged in an adjacent parallel configuration. The singulator includes a first conveyor having a high friction surface for conveying articles forward along a vertical side wall where incoming items are positioned there along. A second conveyor has a low friction surface disposed adjacent the first conveyor at a lower elevation and the second conveyor comprises a series of driven rollers having rotary axes skewed relative to a longitudinal direction of travel so that the packages are conveyed simultaneously longitudinally forward and laterally outwardly away from the first conveyor. The second conveyor is transversely inclined and angled upward. A third conveyor has a high friction surface disposed, slightly above, or even and adjacent to the upper outer edge of the second conveyor for conveying articles forward. The method includes the steps of conveying in a forward direction articles contacting only the first conveyor high friction surface conveying lane, and articles contacting both the first and second low friction surface conveying lane which are moving forward and laterally away from the first conveyor high friction surface conveying lane. Articles contacting the second conveying lane and being out of contact with the first conveying lane are conveyed upward and over a longitudinal edge extending above a third conveyor having a high friction surface lane conveying in a forward direction moving the articles forward and laterally until the center of gravity of the articles extends over the third conveyor where the articles drop off of a chute and are removed or recirculated The singulating method comprises the steps of conveying in a forward direction articles contacting the first conveyor high friction surface conveying lane, and articles contacting both the first conveyor lane and second conveyor lane having a low friction surface. Moving articles resting on the surface of the second conveying lane forward and upward and over a longitudinal edge extending above a third conveyor having a high friction surface lane conveying in a forward direction until the center of gravity of the articles extends over the third conveyor. Moving packages from the third conveyor to a drop off zone is situated adjacent an outer edge of the third conveyor for receiving packages which fall therefrom.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A singulator, comprising:
   a first conveyor, a second conveyor, and a third conveyor, each one driven and arranged in an adjacent parallel configuration;
   said first conveyor having a high friction conveying surface for conveying articles forward along a vertical side wall for receiving articles from an upstream conveyor;
   said second conveyor having a lower friction conveying surface than said first conveyor, said second conveyor disposed beside said first conveyor and having an inner receiving edge disposed at a lower elevation than the outer edge of said first conveyor, said second conveyor comprising a series of driven rollers having rotary axes skewed relative to a forward direction of travel so that said articles are conveyed simultaneously forward and laterally outwardly away from said first conveyor and said vertical side wall, said second conveyor being transversely inclined and angled upward forming an elevated outer side edge;
   said second conveyor having a conveying surface forming an inclined plane extending at an angle above an inner receiving side edge of said adjacent third conveyor and spaced apart from said third conveyor a selected distance conveying said articles from said second conveying surface up and over onto said third conveyor; and
   said third conveyor having a higher friction conveying surface than said second conveyor, said higher friction conveying surface of said third conveyor having an inner receiving side edge at an elevation higher than said elevated outer side edge of said second conveyor.

2. The singulator conveying system of claim, 1 wherein said first conveyor and said third conveyor are in the same horizontal plane.

3. The singulator conveying system of claim 1, wherein said second conveyor is angled in a lateral direction upward from said first conveyor to said third conveyor in a range of from 1 to 30 degrees relative to a horizontal plane of said first conveyor.

4. The singulator conveying system of claim 1, wherein said second conveyor is angled in a lateral direction upward from said first conveyor to said third conveyor in a range of from 5 to 25 degrees relative to a horizontal plane of said first conveyor.

5. The singulator conveying system of claim 1, wherein said first conveyor, said second conveyor, and said third, conveyors are selected from the group consisting of endless belt conveyors, endless roller conveyors, and combinations thereof.

6. The singulator conveying system of claim 1, wherein said high friction surface comprises a plastic, an elastomer, a rubber, a coating, and combinations thereof.

7. The singulator conveying system of claim 1, wherein said lower friction surface comprises a metal, a plastic, a graphite material or a tetrafluoroethylene material.

8. The singulator conveying system of claim 1, wherein said first conveyor high friction surface comprises a belt, said second conveyor lower friction surface comprises rollers, and said third conveyor high friction surface comprises a belt.

9. A method of conveying articles and laterally separating articles abreast of one another utilizing a singulator comprising at least three driven conveyors arranged in an adjacent parallel configuration, a first conveyor having a high friction conveying surface for conveying articles forward along a vertical side wall where incoming articles are positioned there along, a second conveyor having a lower friction conveying surface disposed adjacent said first conveyor, said second conveyor having an inner receiving edge at a lower elevation than said outer edge of said first conveyor, said second conveyor comprising a series of driven rollers having rotary axes skewed relative to a longitudinal direction of travel so that said articles are conveyed simultaneously longitudinally forward and laterally outwardly away from said first conveyor, said second conveyor including an inner edge disposed below an outer edge of said first conveyor, said second conveyor being transversely inclined and angled upward at an angle adjacent an outer edge of a third conveyor said second conveyor having a conveying surface forming an inclined plane having an angle extending above said inner receiving side edge of said third conveyor, said third conveyor having a high friction conveying surface adjacent said second conveyor for conveying articles forward, said third conveyor having an inner receiving side edge at higher elevation than said outer side edge of said second conveyor, the method comprising the steps of:
   a) conveying in a forward direction articles contacting only said first conveyor high friction conveying surface; and
   b) conveying articles resting entirely on said second conveyor conveying surface and articles resting partially on said first conveyor surface and partially on said second conveyor conveying surface and having a center of gravity extending over said second conveyor forward and laterally pulling articles resting partially on said first conveyor from said first conveyor conveying surface onto said second conveyor conveying surface; and
   c) conveying said articles contacting said second conveying surface forward and laterally upward and over a longitudinal edge extending below or even with a inner receiving edge of said third conveyor having a high friction conveying surface conveying in a forward direction whereby said articles are aligned in a single file thereon.

10. The method of conveying articles of claim 9, further comprising the step of rotating said articles onto said third conveyor.

11. The method of conveying articles of claim 9, wherein said outer side edge of said second conveyor extends below an longitudinal inner receiving edge of said third conveyor.

12. A singulator conveying system comprising:
   a singulator comprising at least three driven conveyors arranged in an adjacent parallel configuration;
   a first conveyor having a high friction surface for conveying articles forward along a vertical side wall where incoming articles are positioned there along;

a second conveyor having a lower friction conveying surface disposed beside said first conveyor having an inner receiving edge at a lower elevation, said second conveyor comprising a series of driven rollers having rotary axes skewed relative to a forward direction of travel so that said articles are conveyed simultaneously forward and laterally outwardly away from said first conveyor and said vertical side wall, said second conveyor being transversely inclined and angled upward at a selected angle forming an elevated outer side edge;

said second conveyor having a conveying surface forming an inclined plane extending at a selected angle above a receiving side edge of an adjacent third conveyor; and said adjacent third conveyor having a high friction conveying surface adjacent said second conveyor for conveying articles forward, said high friction surface of said adjacent third conveyor having an inner receiving side edge at an elevation higher or even with said elevated outer side edge of said second conveyor; and wherein said second conveyor angles upward in a range of from 5 to 25 degrees relative to a horizontal plane.

13. The singulator conveying system of claim 12, wherein said second conveyor is angled in a lateral direction upward from said first conveyor to said third conveyor whereby said angle of inclination is from 1 to 30 degrees relative to horizontal plane of said first conveyor.

14. The singulator conveying system of claim 12, wherein said first, second, and third, conveyors are selected from the group consisting of endless belt conveyors, endless roller conveyors, and combinations thereof.

15. The singulator conveying system of claim 12, wherein said high friction surface comprises a plastic, an elastomer, a rubber, a coating, and combinations thereof.

16. The singulator conveying system of claim 12 wherein said lower friction surface comprises a metal, a plastic, a graphite material or a tetrafluoroethylene material.

17. The singulator conveying system of claim 12, wherein said first conveyor high friction surface comprises a belt, said second conveyor lower friction surface comprises rollers, and said third conveyor high friction surface comprises a belt.

* * * * *